(12) United States Patent
Marks et al.

(10) Patent No.: US 7,216,622 B2
(45) Date of Patent: May 15, 2007

(54) WIRING HARNESS WITH INTEGRATED COMPONENT HEAT SHIELD

(75) Inventors: Philip E. Marks, Brighton, MI (US); William T. Rubel, Jr., West Chester, PA (US); Jimmy E. Teal, Mohnton, PA (US); Benjamin B. James, Birchrunville, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/956,550

(22) Filed: Oct. 1, 2004

(65) Prior Publication Data

US 2006/0070598 A1    Apr. 6, 2006

(51) Int. Cl.
*F02B 77/00* (2006.01)
*F02F 7/00* (2006.01)

(52) U.S. Cl. .............................. 123/195 C; 123/143 C; 123/169 PH (58) Field of Classification Search ............ 123/195 C, 123/195 E, 169 PH, 143 C
See application file for complete search history.

(56) References Cited

U.S. PATENT DOCUMENTS

| 5,403,996 A | * | 4/1995 | Mattis et al. ............... 219/265 |
| 5,796,073 A | | 8/1998 | Mattis et al. |
| 6,415,757 B1 | | 7/2002 | Glovatsky |

* cited by examiner

*Primary Examiner*—Stephen K. Cronin
*Assistant Examiner*—Hyder Ali
(74) *Attorney, Agent, or Firm*—Robert L. Stearns; Dickinson Wright PLLC (57) ABSTRACT

A heat shield and heat shield assembly for protecting components exposed to heat are disclosed. The heat shield includes a shroud shaped to cover the component, the shroud having heat reflective layers and a heat insulating layer. The shroud is attached to a clip for removable attachment to the component. A flexible, resilient tab extends from the shroud, the tab providing a means for attaching the heat shield to a wiring harness to form an assembly connectable to the component. The tab is bendable for relative movement of the shroud from a position spaced from the component to a position in which the shroud covers the component upon connection of the wiring harness to the component.

38 Claims, 10 Drawing Sheets

WIRING HARNESS WITH INTEGRATED COMPONENT HEAT SHIELD

FIELD OF THE INVENTION

This invention relates to shielding for use in automotive engine compartments for the protection of electrical components from radiant heat transfer.

BACKGROUND OF THE INVENTION

Sensors used in automotive applications, such as engine knock sensors and oxygen sensors, which provide data to control engine operation and performance, are often mounted within the engine compartment of a vehicle or directly on the engine where they are subject to a harsh physical environment, including intense radiant heat. In view of the harsh environment, it is advantageous to cover the relatively delicate sensors with a flexible, protective heat shield which can reflect radiant heat and prevent heat transfer to the component.

While important to ensure protection of the sensors for proper engine operation, the design of the heat shield is often neglected and not properly integrated into the overall design of the vehicle and its sub-assemblies. Component heat shields are typically designed at the last minute and become separate parts that add to the already substantial inventory of parts for a vehicle. As separate parts, the heat shields are handled individually during vehicle assembly, and must be properly positioned over the correct component in the proper sequence, thereby adding to assembly time and cost.

There is clearly a need for a heat shield that is integrated in a vehicle sub-assembly and therefore need not be handled as a separate part by the vehicle manufacturer with respect to inventory and vehicle assembly.

SUMMARY OF THE INVENTION

The invention concerns a heat shield adapted for use with an elongated electrical conductor to protect an item connected to the conductor. The heat shield comprises a shroud for rejecting heat. The shroud is shaped so as to substantially cover the item. The shroud has a first attachment means for attachment of the shroud to the item. The shield has a second attachment means for attachment of the shroud to the conductor. The second attachment means facilitates positioning of the shroud with respect to the item.

Preferably, the second attachment means comprises an elongated, flexible tab extending from the shroud. The tab is attachable to the conductor and has a bendable portion for relative movement of the shroud and the first attachment means from a position spaced from the item to a position in which the shroud covers the item. In one embodiment, the tab comprises a transverse fold line positioned between the fastener and the shroud, the tab being bendable about the fold line for facilitating the positional adjustment of the shroud.

A fastener is used to attach the tab to the electrical conductor. By way of example, the fastener may comprise adhesive tape extendible around the tab and the electrical conductor, sutures extendible through the tab and engageable with the electrical conductor, lacing filaments extendible around the tab and the electrical conductor, or a rivet attaching the tab to a protective sleeve surrounding the conductor.

The invention also encompasses an assembly engageable with an item for protecting the item from heat energy and providing an electrical connection thereto. The assembly comprises a wiring harness connectable to the item. A protective sleeve surrounds the harness. A shroud for rejecting heat is attached to the sleeve. The shroud is shaped so as to substantially cover the item. A clip is used to attach the shroud to the item. An elongated, flexible tab extends from the shroud and is attached to the sleeve of the harness. The tab has a bendable portion for relative movement of the shroud from a position spaced from the item to a position in which the shroud covers the item. The wiring harness preferably has a connector at one end connectable to the item.

DETAILED DESCRIPTION OF THE PREFERRED EMBODIMENTS

Figure 1:
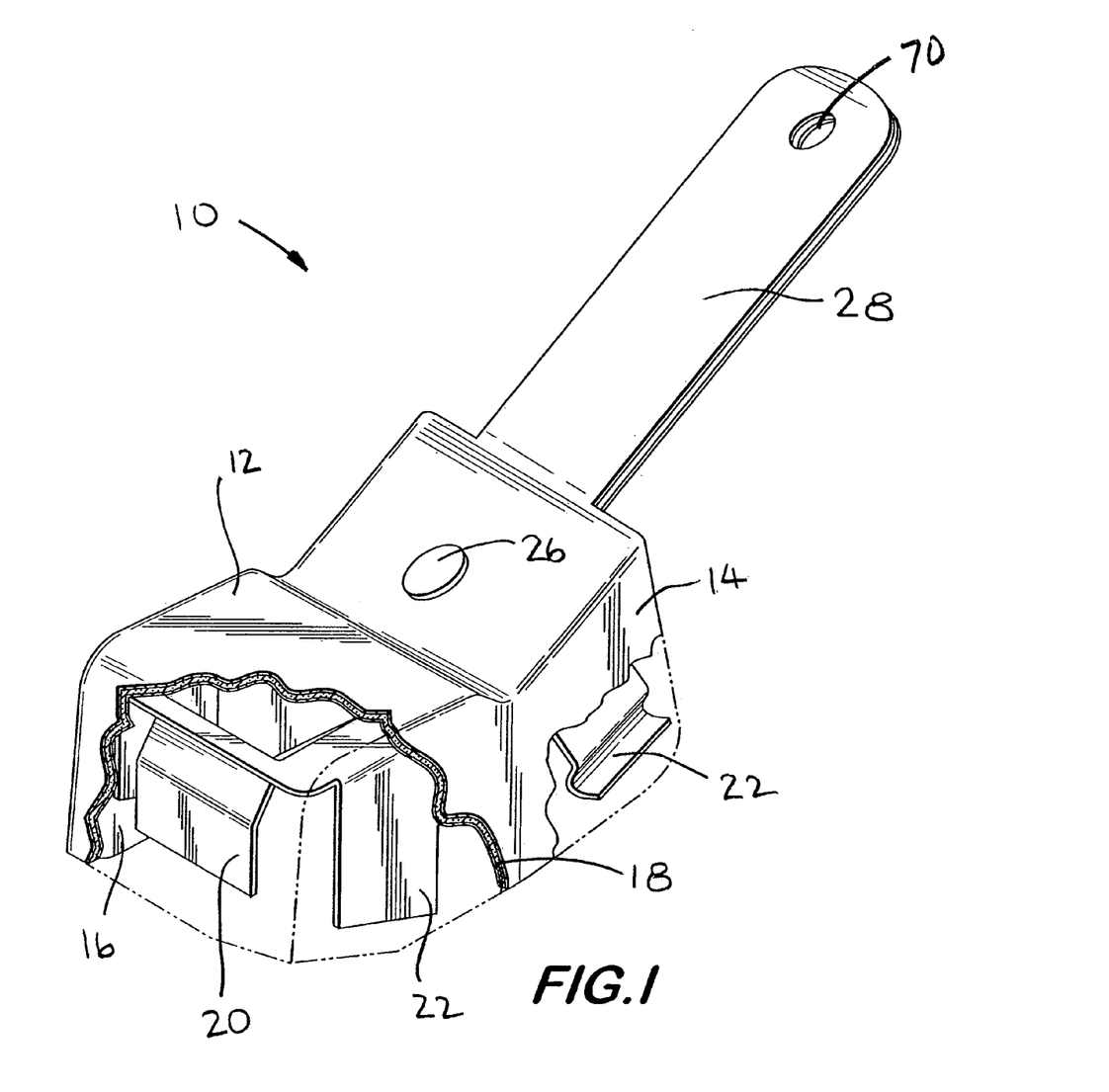
FIG. 1 is a partial sectional perspective view of a heat shield according to the invention.

FIG. 1 shows a heat shield 10 according to the invention. Heat shield 10 comprises a shroud 12 shaped as needed to substantially cover an item to be protected from radiant heat or isolated from other items because it emits radiant heat. Preferably, shroud 12 comprises an outwardly facing reflective layer 14, an inwardly facing reflective layer 16, and an insulating layer 18 positioned between the reflective layers 14 and 16. The reflective layers 14 and 16 may be metal foil, preferably aluminum, and the insulating layer 18 is preferably a non-woven polyester felt, although other non-conducting heat resistant materials such as glass fiber mats are also feasible.

Figure 3:
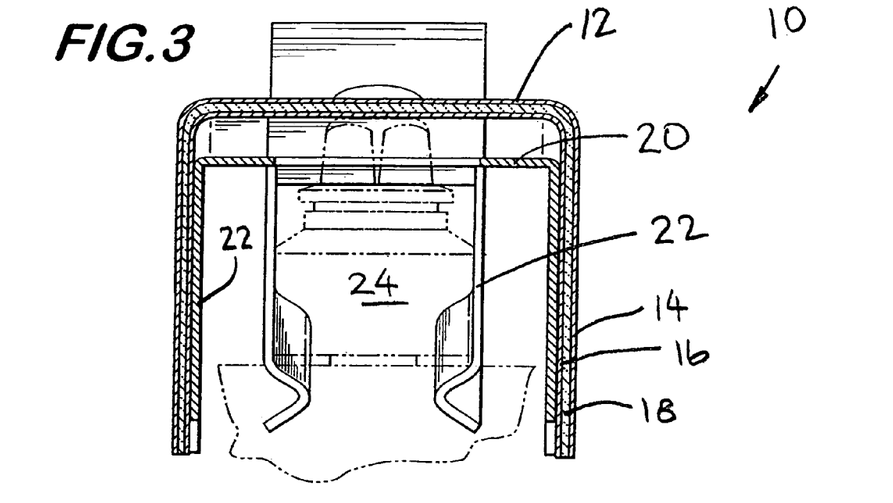
FIG. 3 is a cross-sectional view taken at line 3—3 of FIG. 2.

Heat shield 10 includes a first attachment means, preferably in the form of a clip 20, adapted to engage an item and hold the shield in position thereon. Clip 20 is preferably made from a flexible, resilient material such as a spring steel or a polymer, and has a plurality of resilient arms 22 that are resiliently engageable with the item to which heat shield 10 is to be attached. As shown in FIG. 3, the arms 22 may be positioned in spaced apart facing relation as appropriate to accommodate a particular item 24, for example, an engine knock sensor or an automotive oxygen sensor. Clip 20 is preferably attached on the inwardly facing surface of shroud 12 by a fastener 26, shown in FIG. 1.

For shrouds that are formed of flexible material, the clip 20 also serves to stiffen the shroud and prevent it from deforming and contacting the item covered by the heat shield.

Figure 2:
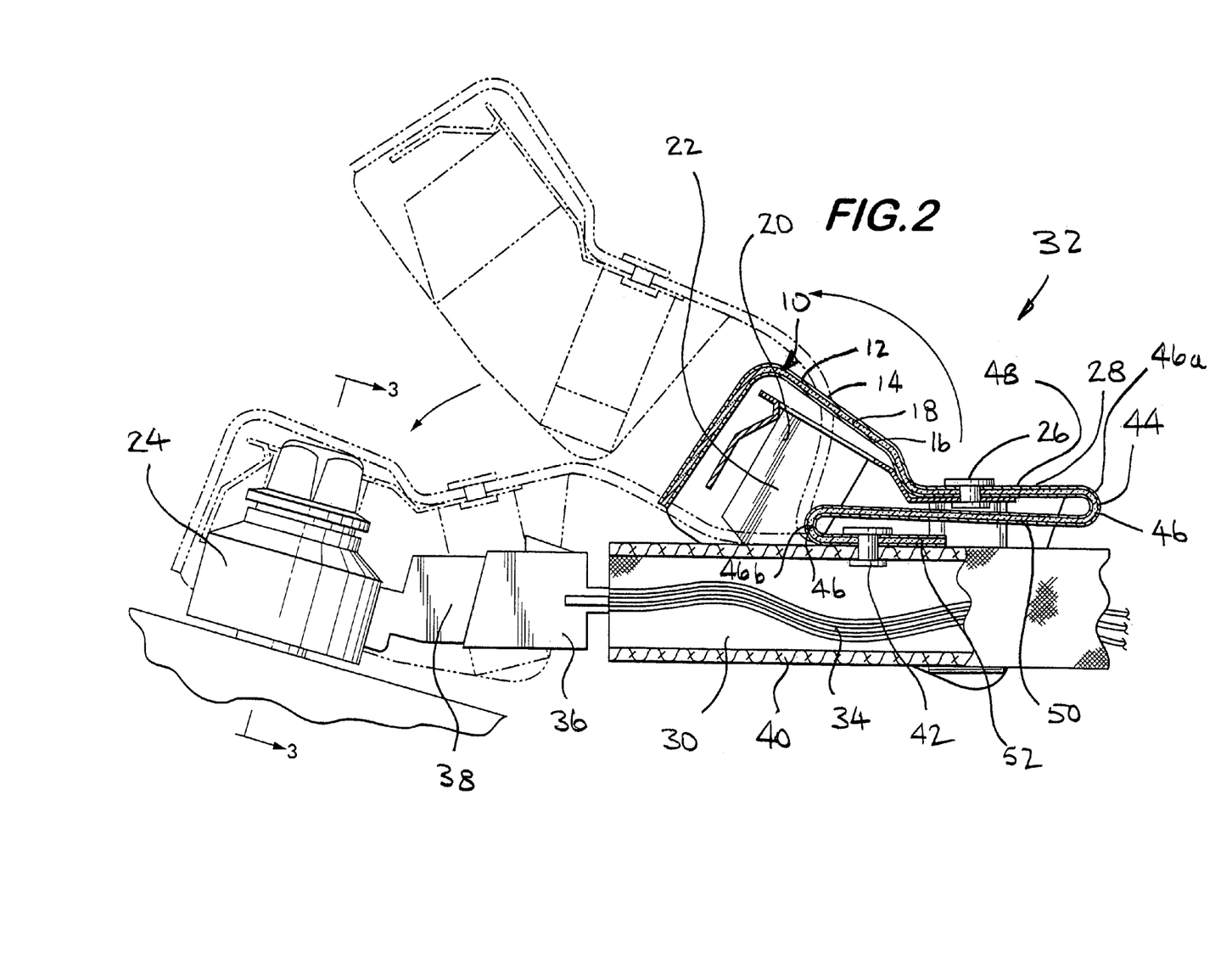
FIG. 2 is a longitudinal sectional view of a heat shield assembly according to the invention.

Heat shield 10 also includes a second attachment means, preferably in the form of an elongated, flexible tab 28. Tab 28 extends from shroud 12 and is preferably formed from the same material as the shroud. As shown in FIG. 2, tab 28 is used to attach the heat shield 10 to a wiring harness 30 and thereby form a heat shield assembly 32. The wiring harness 30 provides an electrical connection to the item 24 and includes, therefore, electrical conductors such as wires 34 attached to a connector 36 compatible with a receptacle 38 on the item 24. Preferably, a protective sleeve 40 surrounds the wires 34, and the tab 28 may be attached to it using a fastener 42 as shown, or attached directly to the wires 34 as described below.

As illustrated in FIG. 2, tab 28 is flexible and elongated and preferably includes one or more bendable portions 44 for relative movement of the shroud 12 from a position spaced from the item 24 (shown in solid line) to a position in which the shroud covers the item (shown in phantom line). Preferably, the bendable portions 44 are defined by transverse fold lines 46 positioned between fastener 42 and shroud 12. In the embodiment shown in FIG. 2, two transverse fold lines, 46a and 46b, define a first fold 48 positioned adjacent to the shroud, a second fold 50 positioned between the fold lines and extending in the opposite direction to first fold 48 and a third fold 52 extending from the second fold line 46b in an opposite direction to the second fold 50. The third fold 52 is attached to sleeve 40 by fastener 42. The bendable characteristic of tab 28 allows it to fold and unfold in the manner of a pleat or accordion fold to cover and uncover the item 24.

Figure 4:
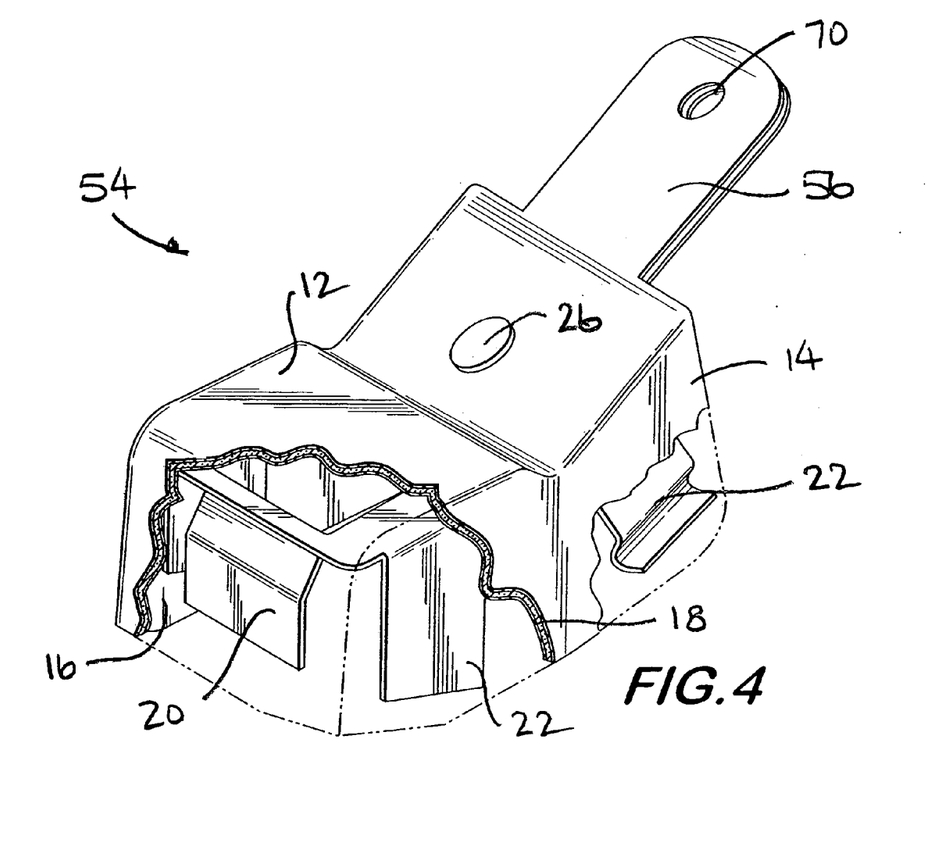
FIG. 4 is a partial sectional perspective view of an alternate embodiment of a heat shield according to the invention.
Figure 5:
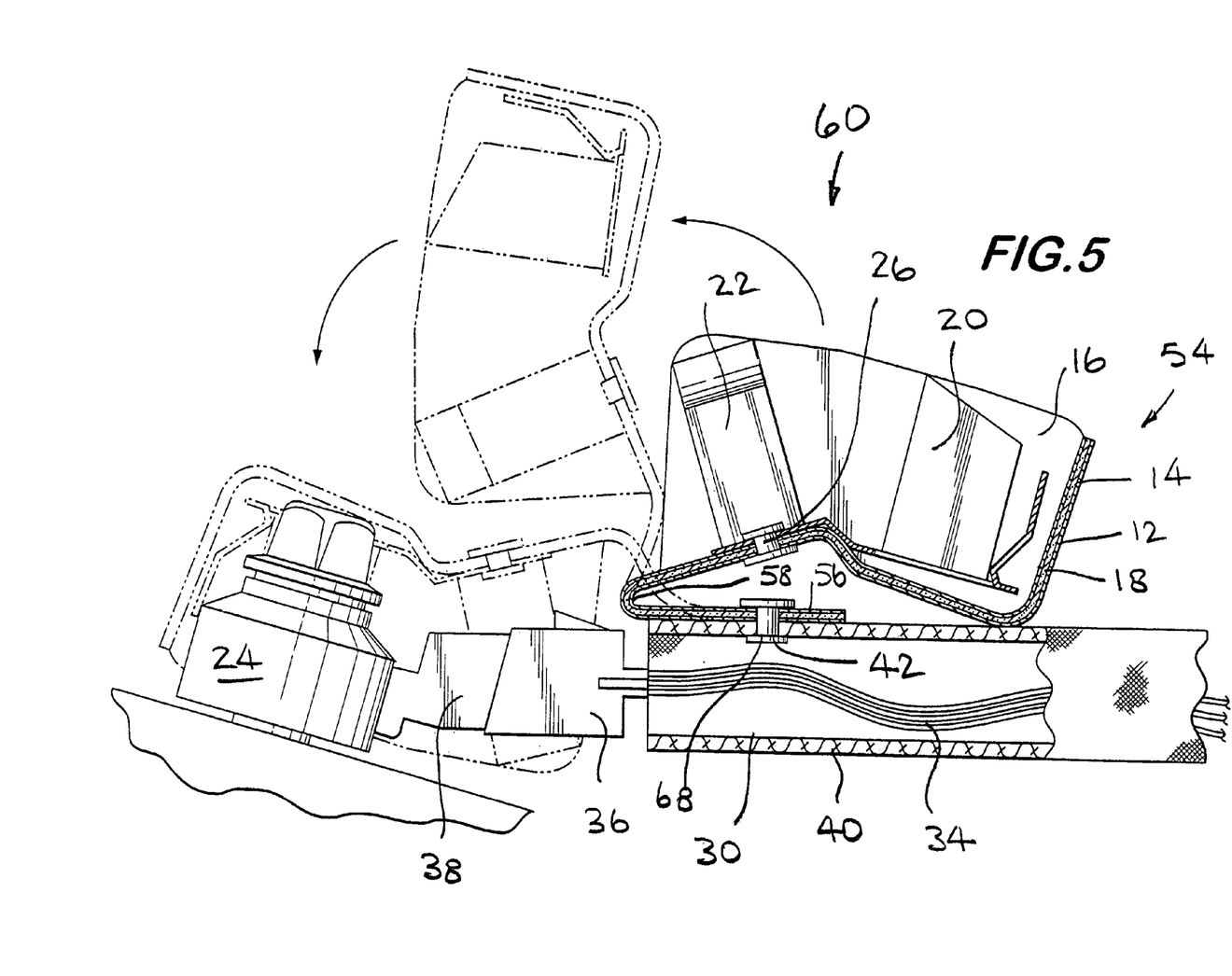
FIG. 5 is a longitudinal sectional view of an alternate embodiment of a heat shield assembly according to the invention.

FIG. 4 shows another embodiment 54 of a heat shield according to the invention. Heat shield 54 differs from the embodiment 10 in that tab 56 is shorter than tab 28 shown in FIGS. 1 and 2. As shown in FIG. 5, tab 56 is elongated, flexible and has a bendable portion 58 for relative movement of the shroud 12 from a position spaced from the item 24 (shown in solid line) to a position in which the shroud covers the item (shown in phantom line). Again, the tab may be attached to a wiring harness 30 by a fastener 42 to form a heat shield assembly 60.

Figure 6:
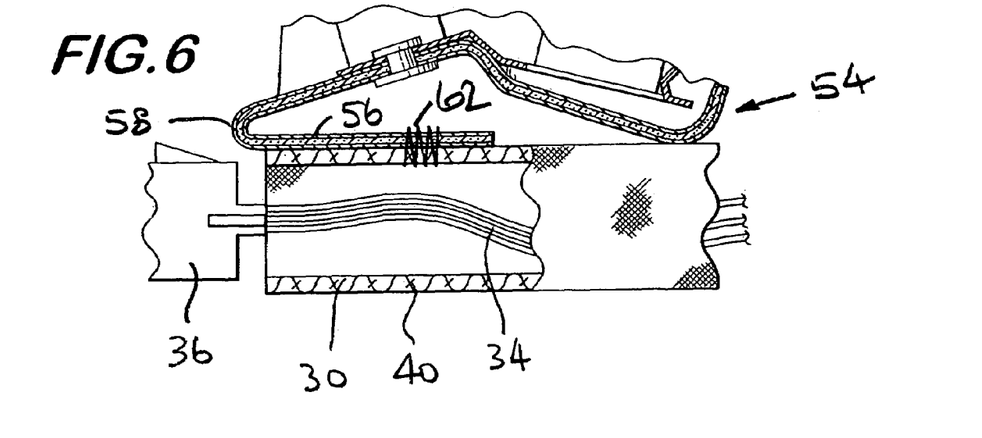
FIGS. 6–9 are partial sectional views showing details of various embodiments of the heat shield assembly according to the invention.
Figure 7:
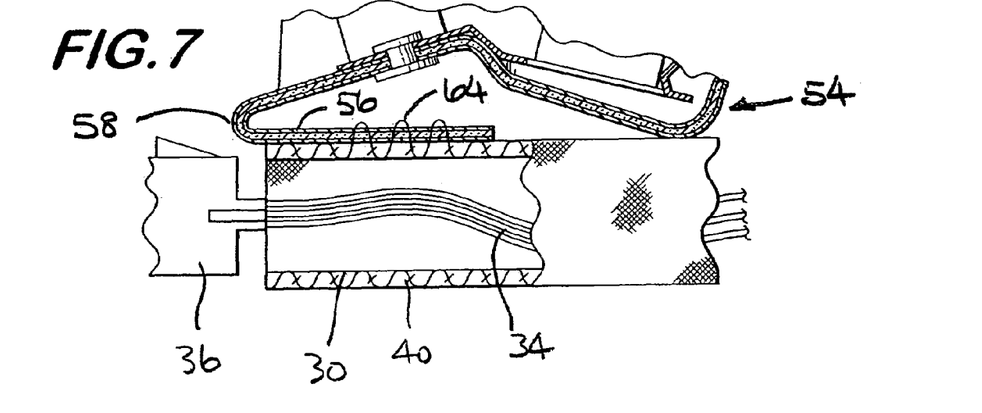
Figure 8:
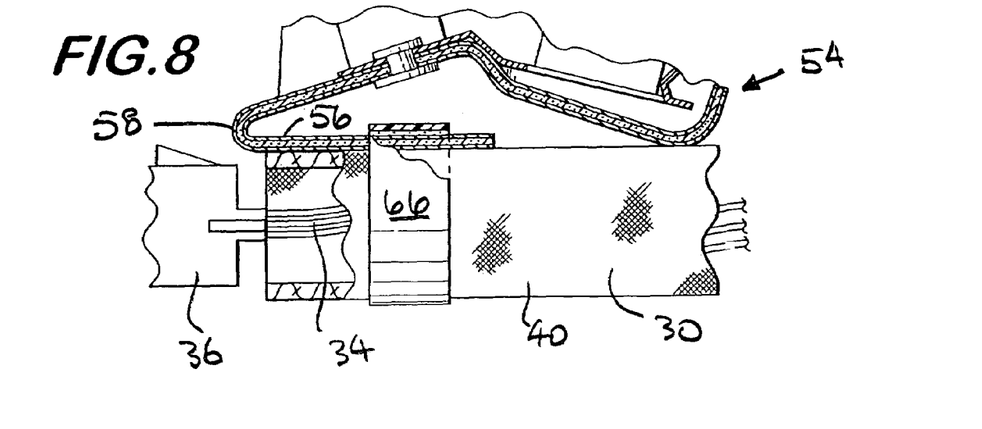
Figure 9:
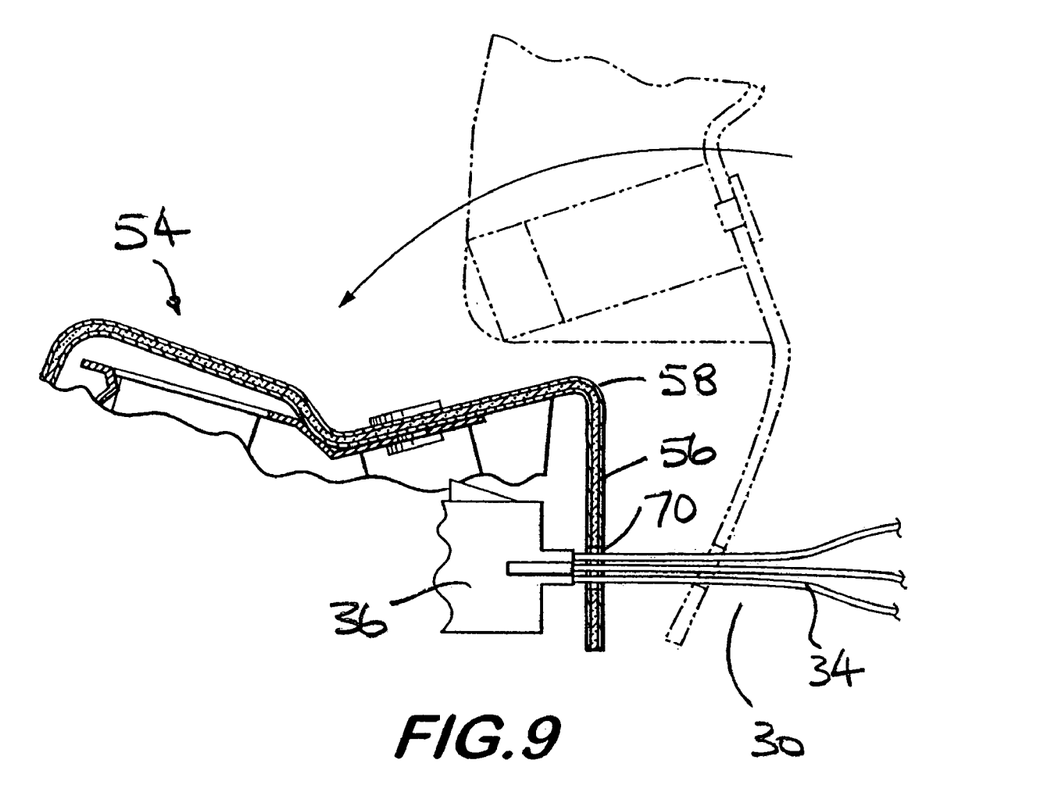

FIGS. 6–9 illustrate various types of fasteners for use with the heat shield and heat shield assembly according to the invention. FIG. 6 shows sutures or stitches 62 used to attach the tab 56 to sleeve 40, the tab and sleeve being sewn together. In FIG. 7, lacing filaments 64 engage both the tab 56 and the sleeve 40 to effect attachment. The lacing filaments may be interlaced with the sleeve as shown or extend around the assembly. As shown in FIG. 8, adhesive tape 66 extends around the sleeve 40 and the tab 56, while in FIG. 5, a mechanical fastener, for example, a rivet 68, is used to secure sleeve to tab. In FIG. 9, an aperture 70 positioned in tab 56 receives wires 34 to effect attachment to the heat shield 54. It is understood that any of the various attachment fasteners shown may be used with any embodiment of the heat shield to form the heat shield assembly according to the invention.

Figure 10:
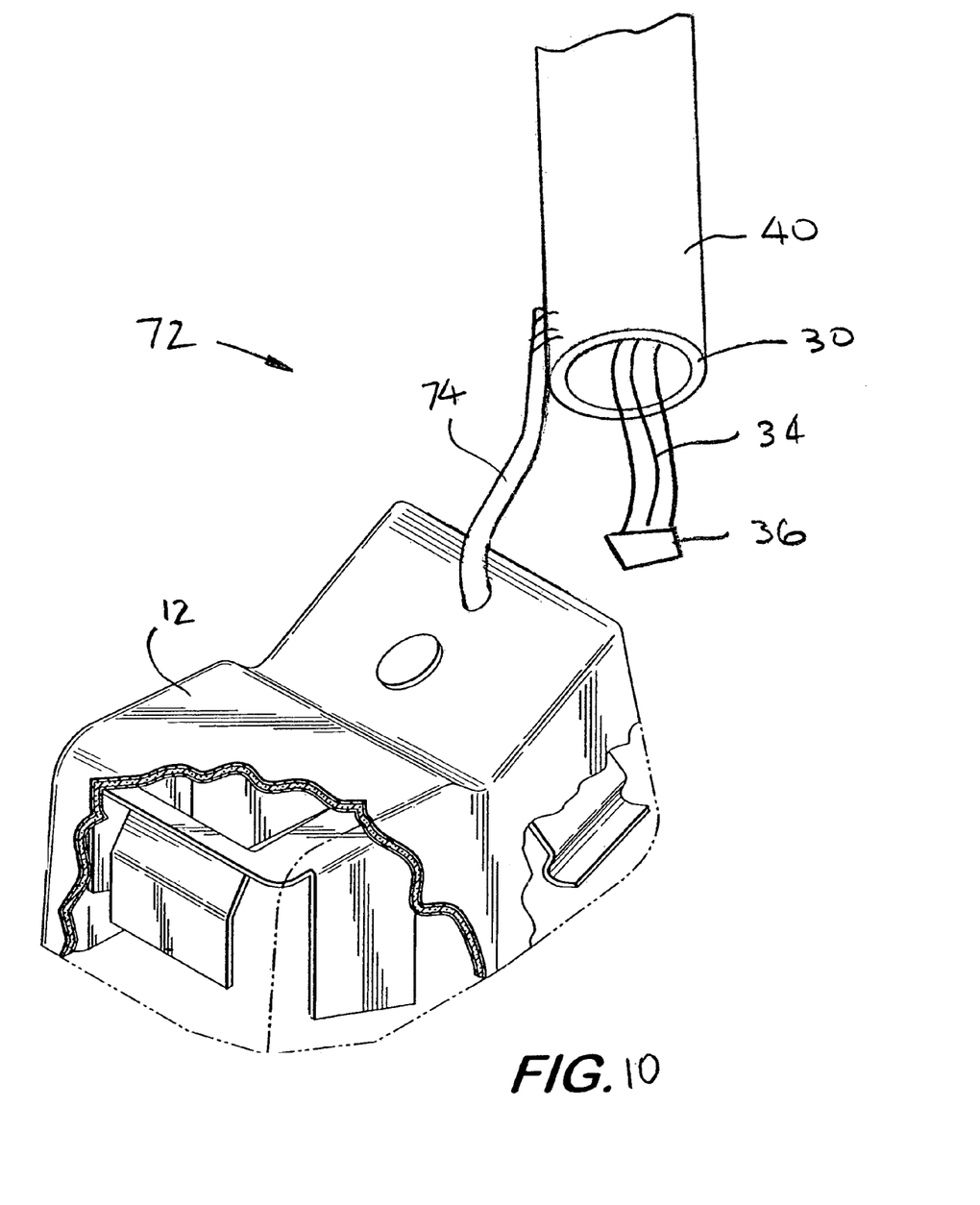
FIG. 10 is a perspective view of an alternate embodiment of a heat shield assembly according to the invention.

FIG. 10 shows another embodiment of a heat shield assembly 72 wherein the shroud 12 is attached to the protective sleeve 40 by a tether 74. Tether 74 is a flexible filament and could, for example, comprise a deformable wire or a cord. Attachment of the tether to the sleeve may be effected by any of the above identified attachment methods.

Figure 11:
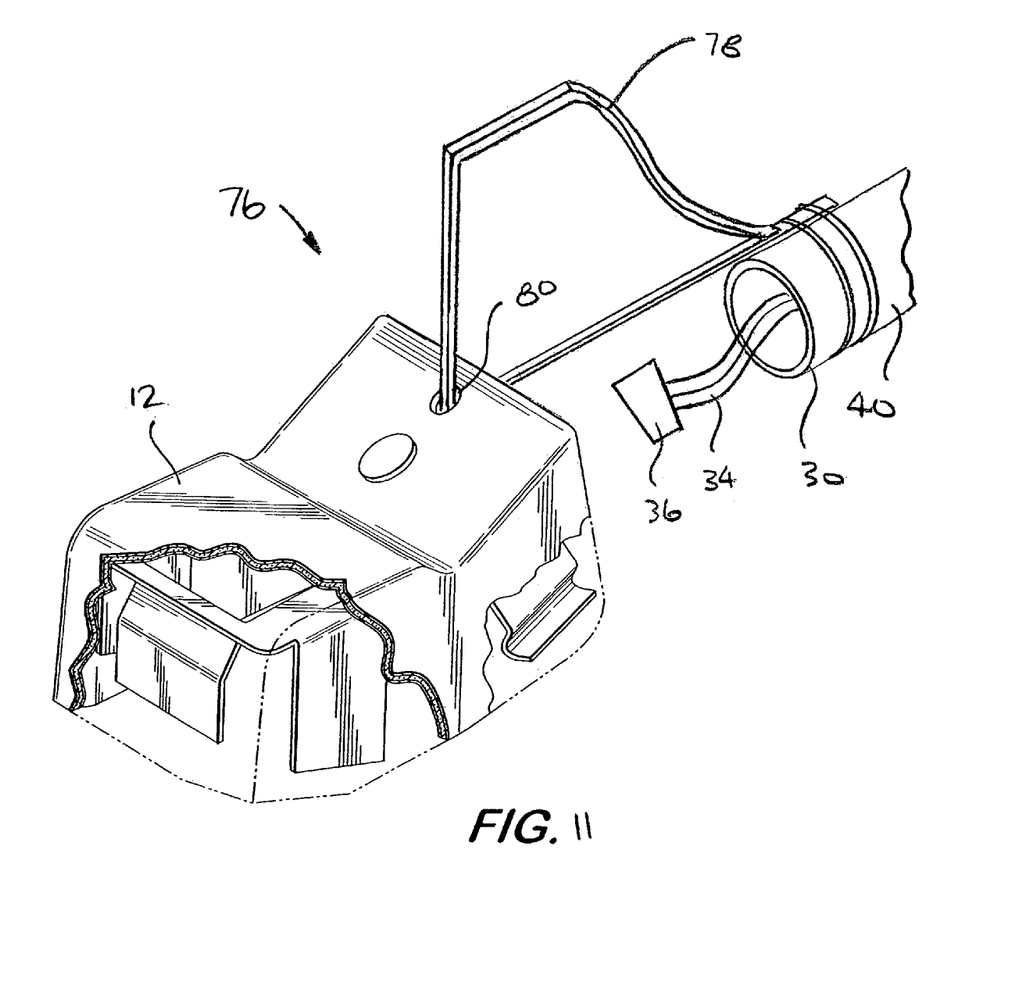
FIG. 11 is a perspective view of another embodiment of a heat shield assembly.

FIG. 11 illustrates another embodiment of a heat shield assembly 76 wherein the means for attaching the shroud 12 to the sleeve 40 comprises a filamentary loop 78. Loop 78 preferably comprises a resilient wire and is attachable to the sleeve 40 as shown or the wires 34 comprising harness 30 by any of the means described above. Shroud 12 has an aperture 80 that receives loop 78 for attachment of the shroud to the sleeve. The shroud is slidably movable along the loop for movement from a position spaced from the item to a position in which the shroud covers the item.

Figure 12:
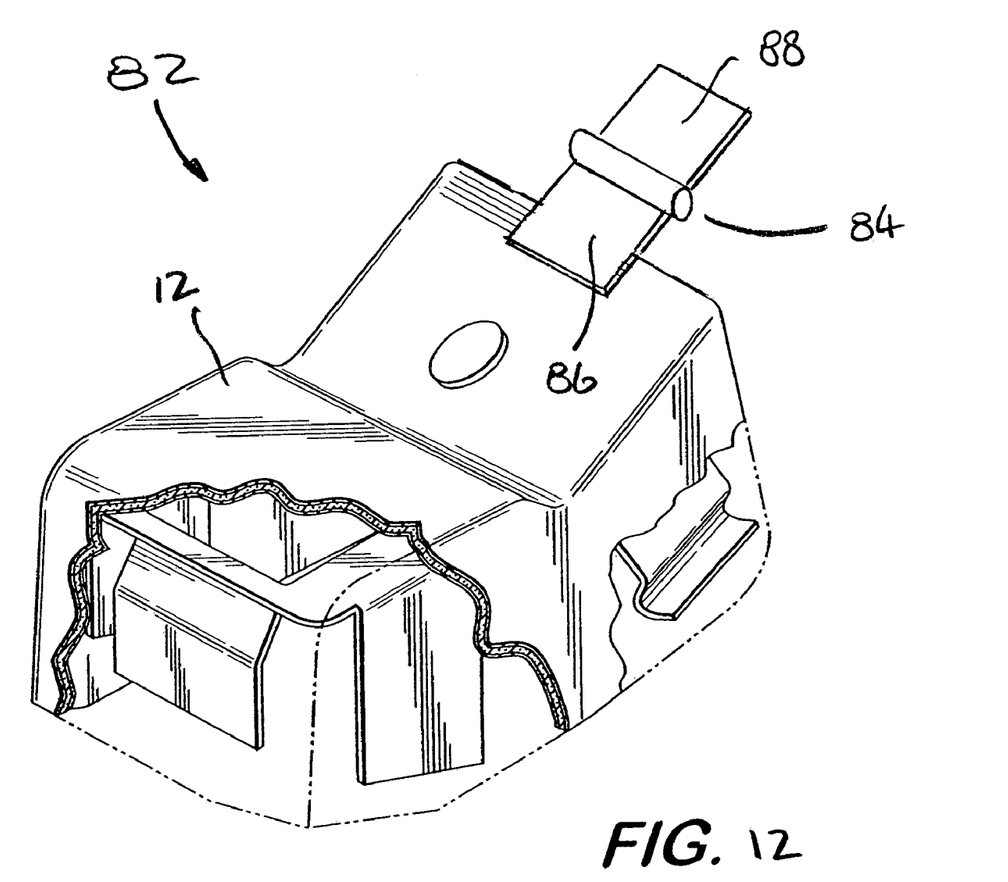
FIG. 12 is a perspective view of yet another embodiment of a heat shield.

In another embodiment of the heat shield 82, the means for attaching the shroud 12 comprises a hinge 84. A first hinge portion 86 is attached to the shroud and a second hinge portion 88 is attachable to the wiring harness, for example, the protective sleeve component. Hinge 84 may have locking features to hold it in a particular position, or it may be biased to force the shroud into engagement with an item.

Figure 13:
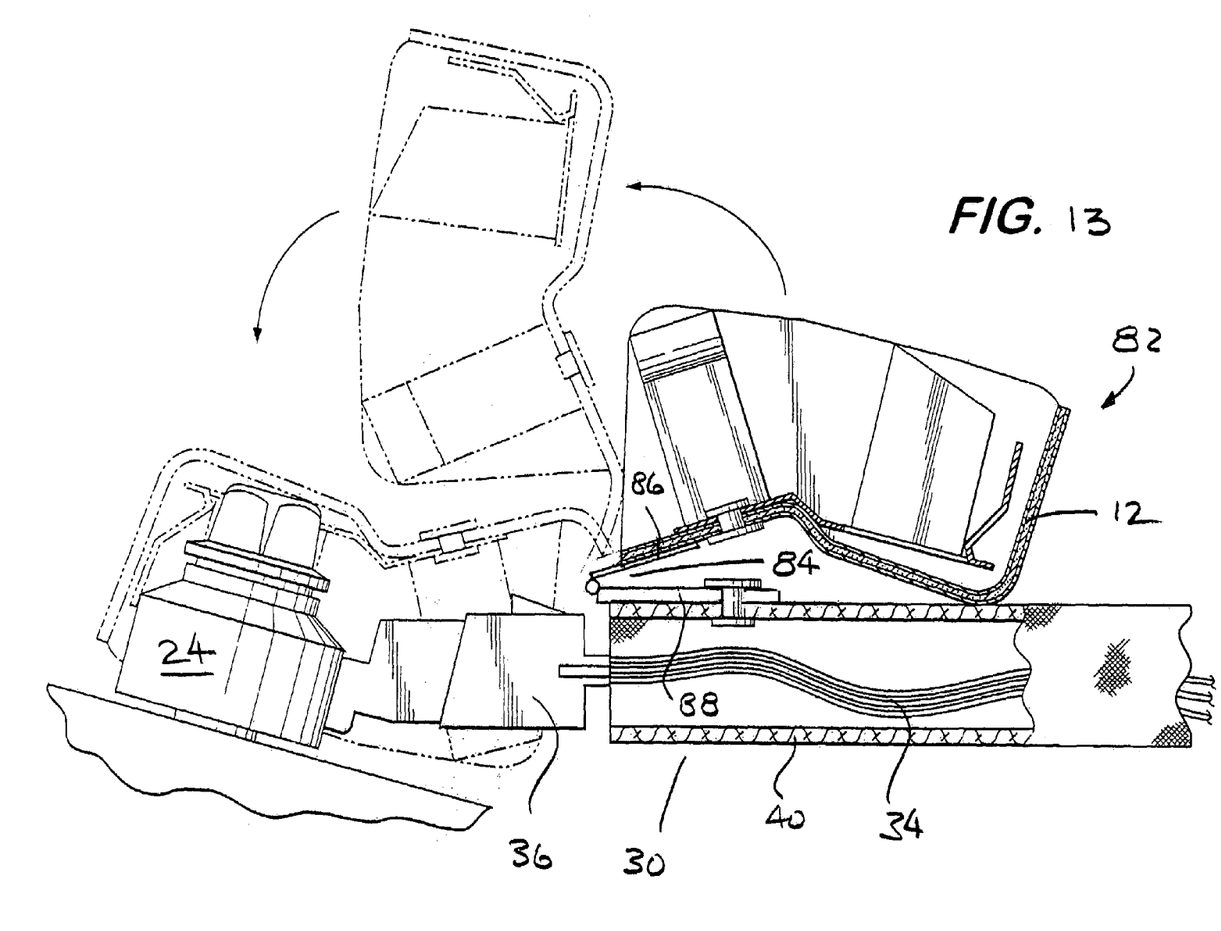
FIG. 13 is a partial sectional view of the heat shield of FIG. 12 shown in an assembly.

As best shown in FIG. 13, hinge 84 effects pivoting of the shroud 12 from a position spaced from the item 24 (shown in solid line) to a position in which the shroud covers the item, shown in phantom line.

Heat shields and heat shield assemblies according to the invention provide numerous advantages over conventional heat shields currently in use. By forming a heat shield that is readily combinable with a wiring harness, the shield becomes an integral part of a subassembly for a vehicle. This simplifies logistics and production, as fewer parts must be kept on inventory, shipped, handled and assembled into the vehicle. This saves time and reduces costs at the vehicle assembly stage of manufacture.

What is claimed is:

1. A heat shield adapted for use with an elongated electrical conductor to protect an item connected to said conductor, said heat shield comprising:
   a shroud for rejecting heat, said shroud being shaped so as to substantially cover said item;
   a first attachment for attaching said shroud directly to said item;
   a second attachment configured differently from said first attachment for attaching said shroud to said conductor and positioning said shroud with respect to said item; and
   wherein said second attachment means comprises an elongated, flexible tab extending from said shroud, said tab being attachable to said conductor, said tab having a bendable portion for relative movement of said shroud and said first attachment means from a position spaced from said item to a position in which said shroud covers said item.

2. A heat shield according to claim 1, further comprising an aperture extending through said tab, said aperture being adapted to receive said conductor for attachment of said tab thereto.

3. A heat shield according to claim 1, further comprising a fastener attached to said tab, said fastener for attaching said tab to said electrical conductor.

4. A heat shield according to claim 3, wherein said fastener comprises adhesive tape extendible around said tab and said electrical conductor.

5. A heat shield according to claim 3, wherein said fastener comprises adhesive tape extendible around said tab and said electrical conductor.

6. A heat shield according to claim 3, wherein said fastener comprises lacing filaments extendible between said tab and said electrical conductor.

7. A heat shield according to claim 1, wherein said tab comprises a transverse fold line, said tab being bendable about said fold line for positional adjustment of said shroud relatively to said electrical conductor and said item.

8. A heat shield according to claim 1, wherein said tab comprises first and second transverse fold lines positioned in spaced apart relation to one another, said tab being bendable at said first fold line to form a first fold positioned adjacent to said shroud, a second fold extending from said first fold line in an opposite direction to said first fold, said tab being bendable at said second fold line to form a third fold extending from said second fold line in a direction opposite to said second fold.

9. A heat shield according to claim 8, further including a fastener comprises adhesive tape extendible around said second fold of said tab and said electrical conductor.

10. A heat shield according to claim 1, wherein said second attachment means comprises a tether having a first portion attachable to said conductor and a second portion attached to said shroud.

11. A heat shield according to claim 1, wherein said second attachment means comprises a filamentary loop attachable to said conductor, said shroud having an aperture therethrough for receiving said loop, said shroud being slidably movable along said loop for movement from a position spaced from said item to a position in which said shroud covers said item.

12. A heat shield according to claim 11, wherein said filamentary loop comprises a resilient wire.

13. A heat shield according to claim 1, wherein said second attachment means comprises a hinge having a first hinge member attachable to said conductor and a second hinge member attached to said shroud, said hinge for effecting pivoting of said shroud from a position spaced from said item to a position in which said shroud covers said item.

14. A heat shield adapted for use with an elongated electrical conductor to protect an item connected to said conductor, said heat shield comprising:
 a shroud for rejecting heat, said shroud being shaped so as to substantially cover said item;
 a first attachment means for attachment of said shroud to said item;
 a second attachment means for attachment of said shroud to said conductor for positioning said shroud with respect to said item;
 wherein said second attachment means comprises an elongated, flexible tab extending from said shroud, said tab being attachable to said conductor, said tab having a bendable portion for relative movement of said shroud and said first attachment means from a position spaced from said item to a position in which said shroud covers said item; and
 wherein said shroud comprises a heat reflecting surface for reflecting radiant heat energy.

15. A heat shield according to claim 14, wherein said shroud comprises an insulating layer positioned between said first attachment means and said heat reflecting surface, said insulating layer for preventing conductive heat transfer to and from said item.

16. A heat shield according to claim 15, wherein said shroud further comprises a heat reflecting layer positioned between said insulating layer and said first attachment means.

17. An assembly engageable with an item for protecting the item from heat energy and providing an electrical connection thereto, said assembly comprising:
 a wiring harness connectable to said item;
 a shroud for rejecting heat, said shroud being shaped so as to substantially cover said item;
 a clip operative for direct attachment to said item and being attached to said shroud; and
 a tab configured differently from said clip and extending from said shroud, said tab being attached to said harness in a manner to enable relative movement of said shroud from a position spaced from said item to a position in which said shroud covers said item.

18. An assembly according to claim 17, further comprising a protective sleeve surrounding said harness, said tab being attached to said sleeve.

19. An assembly according to claim 18, further comprising a fastener attached to said tab, said fastener engaging said sleeve and attaching said tab thereto.

20. An assembly according to claim 19, wherein said tab comprises a bendable portion positioned between said fastener and said shroud, said bendable portion permitting relative movement of said shroud and said clip from a position spaced from said item to a position in which said shroud covers said item.

21. An assembly according to claim 19, wherein said fastener comprises a rivet attaching said tab to said sleeve.

22. An assembly according to claim 17, wherein said wiring harness comprises a connector at one end connectable to said item.

23. An assembly according to claim 17, further comprising an aperture extending through said tab, said aperture being adapted to receive said wiring harness for attachment of said tab thereto.

24. An assembly according to claim 17, wherein said bendable portion comprises a plurality of folds separated by transverse fold lines.

25. An assembly according to claim 17, wherein said shroud comprises a reflecting surface mounted on said clip.

26. An assembly according to claim 25, wherein said shroud comprises an insulating layer positioned between said reflecting surface and said clip.

27. An assembly according to claim 26, wherein said shroud comprises a second reflecting surface positioned between said insulating layer and said clip.

28. An assembly engageable with an item for protecting said item from heat energy and providing an electrical connection thereto, said assembly comprising:
 a wiring harness connectable to said item;
 a shroud for rejecting heat, said shroud being shaped so as to substantially cover said item;
 a clip attached to said shroud and adapted for direct attachment to said item;
 means configured differently from said clip for attaching said shroud to said wiring harness; and
 a protective sleeve surrounding said harness, said attachment means being attached to said protective sleeve.

29. An assembly according to claim 28, wherein said attachment means comprises a tether having a first portion attached to said protective sleeve and a second portion attached to said shroud.

30. An assembly according to claim 28, wherein said attachment means comprises a filamentary loop, said loop being attached to said sleeve, said shroud having an aperture therethrough for receiving said loop, said shroud being slidably movable along said loop for movement from a position spaced from said item to a position in which said shroud covers said item.

31. An assembly according to claim 30, wherein said loop comprises a resilient wire.

32. An assembly according to claim 28, wherein said attachment means comprises a hinge having a first hinge member attached to said protective sleeve and a second hinge member attached to said shroud, said hinge for effecting pivoting of said shroud from a position spaced from said item to a position in which said shroud covers said item.

33. A heat shield adapted for use with an electrical conductor to protect an item connected to said conductor, said heat shield comprising:

a shroud for rejecting heat, said shroud being shaped so as to substantially cover said item;

an attachment clip adapted to attach said shroud to said item; and an elongated, flexible tab configured differently from said attachment clip extending from said shroud and attachable to said conductor, said tab having a bendable portion for relative movement of said shroud and said clip from a position spaced from said item to a position in which said shroud covers said item.

34. A heat shield according to claim 33, wherein said shroud comprises:

a first heat reflecting surface facing outwardly from said attachment clip for blocking radiant heat;

a second heat reflecting surface facing inwardly toward said item for locking radiant heat; and an insulating layer positioned between said first and second reflecting layers for blocking conductive heat transfer.

35. A heat shield according to claim 33, further comprising an aperture extending through said tab, said aperture being adapted to receive said conductor for attachment of said tab thereto.

36. A heat shield according to claim 33, further comprising a fastener attachable to said tab, said fastener being extendable around said electrical conductor for attaching said tab thereto.

37. A heat shield according to claim 36, wherein said bendable portion is positioned between said fastener and said shroud.

38. A heat shield according to claim 33, wherein said bendable portion comprises a plurality of folds joined at a plurality of transverse fold lines positioned in said tab.

* * * * *